Patented July 22, 1941

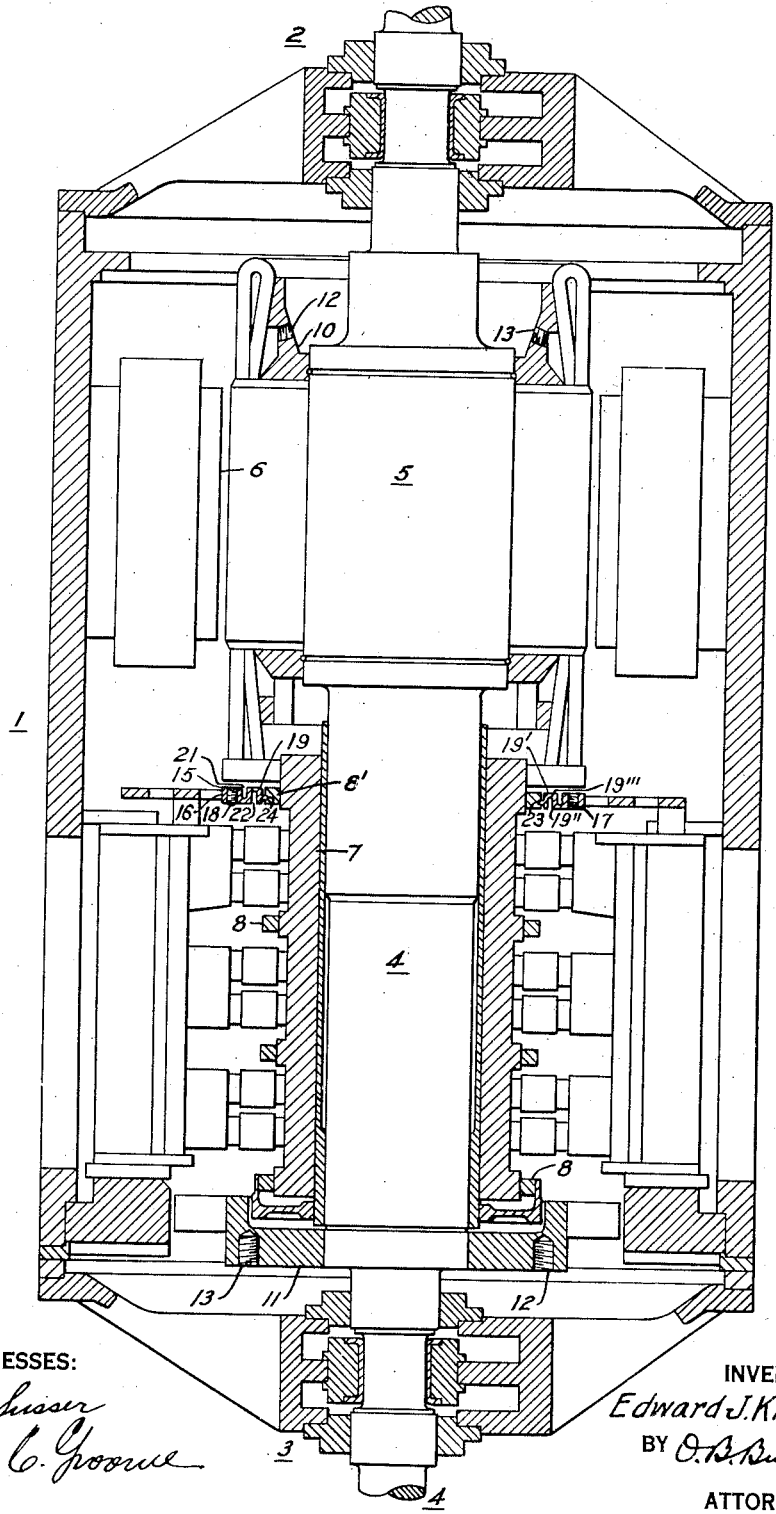

2,249,834

UNITED STATES PATENT OFFICE 2,249,834

BALANCE-RING COMBINATION

Edward J. Kreh, Jr., Edgewood, Pa., assignor to Westinghouse Electric & Manufacturing Company, East Pittsburgh, Pa., a corporation of Pennsylvania Application July 12, 1940, Serial No. 345,087

4 Claims. (Cl. 171—252)

My invention relates to the provision of balance-rings for highly stressed parts such as the shrink-rings on shrink-ring commutators, and it has more particular application to high-speed direct-current generators which are used as exciters which are directly mounted on the shafts of turbo-generators.

Heretofore such machines have been balanced by means of holes drilled in each of two balance-rings which are mounted at the respective ends of the shaft, near the supporting-bearings. In machines having unusually long armatures, which means a long shaft between the two bearings, shaft-whipping troubles have been encountered by reason of unbalanced conditions located near the center of the shaft, so that it has become desirable to provide a third balance-plane near the center of the shaft, or, for practical purposes, on the rear shrink-ring of the commutator, or the shrink-ring closest to the rotor-core. However, it is impossible, or certainly highly impracticable, to drill holes in the highly stressed rear shrink-ring of the commutator, as this shrink-ring has a stress of about 20,000 pounds per square inch at rest, cold, which increases to about 70,000 pounds per square inch at overspeed when the ring is hot. Under such circumstances, a hole drilled into such a ring would produce stress-concentration factors which would result in the failure of the ring.

The principal object of the invention is to provide a separate cantilever-mounted balancing-ring which may be attached to the outer periphery of a highly stressed shrink-ring, and which will provide a resiliently coupled, relatively unstressed ring-portion which can safely be drilled for the purpose of obtaining an exact mechanical balance so as to avoid vibration or whipping of the shaft.

An exemplary form of embodiment of my invention is shown in the drawing, the single figure of which is a longitudinal cross sectional view through a turbo-generator exciter embodying my invention.

The drawing shows a high-speed direct-current generator which is adapted to be utilized as a turbo-generator exciter, and which comprises a stator member 1 having two bearings 2 and 3, a shaft 4 journaled in said bearings, and a generator-rotor mounted upon said shaft and including a rotor-core 5 disposed in operative relation to the stator-core 6 of the stator-member 1, and a commutator-member 7 provided with shrink-rings 8 which are provided at spaced points along the length of the commutator for the purpose of preventing the commutator-bars from bowing out excessively under the influence of centrifugal stresses. Such a machine has heretofore been balanced solely by means of two balancing rings 10 and 11 which have been rigidly mounted on the shaft near the respective bearings 2 and 3, said rings being adapted to be drilled with holes 12 so as to receive balance-weights or plugs 13 within said holes, at places as determined by a balance-testing machine (not shown), whereby the machine was balanced so as to avoid vibration.

In long machines such as the one illustrated in my drawing, it has been found that the most perfect balance obtainable by balancing at the ends of the long shaft would not suffice to keep the shaft from whipping badly as a result of masses along the central portion of the shaft not being compensated for near their point of application; but it has not been practicable to provide a third balancing plane near the central portion of the shaft for lack of an available ring-member which could safely be drilled to receive the balancing weights.

In accordance with my invention, I provide, in encircling relation to the rear shrink-ring 8' of the commutator, that is, the shrink-ring closest to the rotor-core 5, a cantilever-mounted balancing-ring 15 comprising a substantially unstressed, or relatively lightly stressed, ring-portion 16 of a size suitable for being drilled with holes 17 for carrying one or more balance-weights 18. By "unstressed" I mean not stressed as a result of deflections of the inner ring or shrink-ring 8'. This ring-portion 16 is resiliently secured to the outer surface of its associated shrink-ring 8' by means of a cantilever-portion 19 which is illustrated as comprising a portion bent back upon itself, said portion being obtained by means of two annular slots 21 and 22 which are cut in opposite sides of the balancing ring 15, at different radii, thereby providing an inner cantilever-portion 19' and an outer cantilever-portion 19''.

In the preferred form of embodiment of my invention, the inner cantilever-portion 19' makes contact with the outer surface of the shrink-ring 8' at or near the free end-portion 23 of said inner cantilever-member 19', that is, at the portion thereof furthest away from the bight-portion 19''' which is disposed at the inner end of the annular slot 22, so as to connect the two cantilever-portions 19' and 19''. In the illustrated form of embodiment, the contacting portion 23 of the cantilever-end of the balance-ring attachment 15 is shaped in the form of an inwardly projecting annular shoulder-portion 23 which engages within an annular slot 24 which is cut in the outer surface of the associated shrink-ring 8'. This slot 24 does not result in prohibitive stress-concentrations in the shrink-ring 8' because it extends all of the way around the shrink-ring in the direction of the stress and not across the stress, and hence is not dangerous, as would be the case of a hole drilled at any one spot within the shrink-ring. The balancing ring 15 is conveniently assembled by heating it and shrinking it in place on the shrink-ring 8'.

In operation, vibration or whipping of the shaft is avoided by the balance-weights 18. It will be noted that the cantilever-portions 19' and 19" have a certain amount of resilience which makes it possible for these portions of my balance-ring attachment to give or yield, cantilever-fashion, in response to the elastic deformations of the highly-stressed shrink-ring 8', so as not to appreciably stress the ring-portion 16 which carries the balance-weights 18. It will be noted that the cantilever-portions 19' and 19" are machined smoothly in a circumferential direction, and that they contain no local holes or other surface-deformations which would result in stress-concentration factors such as might result in failure, the locally drilled holes being confined to the relatively unstressed ring-portion 16, where the stress-concentration factors resulting from such holes would do no damage.

As a result of my utilization of the inwardly directed annular contact-shoulder 23, disposed at the free end of the inner cantilever-portion 19', I am enabled to utilize said inner cantilever portion as a part of the complete cantilever-member 19'—19'''—19'', although it is within the scope or purport of my invention to make use of less or more of these cantilever-portions, or to provide cantilever-portions which are disposed and arranged in a different manner, the really essential feature of the cantilever-portions being that they shall provide a resilient mechanical attachment which prevents the expansion of the shrink-ring 8' from being transmitted directly to the ring-portion 16 which carries the balance-weights 18.

I claim as my invention:

1. In a machine having a rotating part, the combination with a cylindrical-surfaced, highly stressed member of the rotating part, of a balance-ring attachment encircling said highly stressed member and comprising a ring-proper having one or more holes therein with a balance-weight in one or more of said holes, and a flexible cantilever-part joining said ring-proper to said highly stressed member, said cantilever-part having an annular member encircling the cylindrical surface of said highly stressed member.

2. In a machine having a rotating part, the combination with a rotating part which is subject to elastic deformation, of a flexibly mounted balance-ring comprising a ring-proper having one or more holes therein with a balance-weight in one or more of said holes, and a flexible cantilever-part joining said ring-proper to said rotating part which is subject to elastic deformation.

3. A dynamo-electric machine having a stator-member and a rotor-member, the rotor-member having a shaft, a rotor-core, a cylindrical commutator-member, and means mounted on the shaft near the front end of the commutator-member for providing a first balancing ring having one or more holes therein with a balance-weight in one or more of said holes, said commutator-member having a plurality of shrink-rings disposed thereon at axially spaced intervals, and a balance-ring attachment encircling the rearmost one of said shrink-rings, nearest the rotor-core, said balance-ring attachment comprising a ring-proper having one or more holes therein with a balance-weight in one or more of said holes, and a flexible cantilever-part joining said ring-proper to said rearmost shrink-ring, said cantilever-part having an annular member encircling said rearmost shrink-ring.

4. A dynamo-electric machine having a stator-member and a rotor-member, said stator-member having two bearings, said rotor-member having a shaft journaled in said bearings, said rotor-member also comprising a rotor-core mounted on the shaft, a cylindrical commutator-member mounted on the shaft near the front end of the rotor-core, means mounted on the shaft near the front end of the commutator member for providing a first balancing ring having one or more holes therein with a balance-weight in one or more of said holes, and means mounted on the shaft near the rear end of the rotor-core for providing a second balancing ring having one or more holes therein with a balance-weight in one or more of said holes, said commutator-member having a plurality of shrink-rings disposed thereon at axially spaced intervals, and a balance-ring attachment encircling the rearmost one of said shrink-rings and comprising a ring-proper having one or more holes therein with a balance-weight in one or more of said holes, and a flexible cantilever-part joining said ring-proper to said rearmost shrink-ring, said cantilever-part having an annular member encircling said rearmost shrink-ring.

EDWARD J. KREH, Jr.